United States Patent [19]

Durand et al.

[11] 3,875,076
[45] Apr. 1, 1975

[54] SOLID CATALYSTS FOR USE FOR THE POLYMERIZATION OF OLEFINS

[75] Inventors: Daniel Durand; Pierre Mangin, both of Martigues, France

[73] Assignee: Naphtachimie, Paris, France

[22] Filed: July 25, 1973

[21] Appl. No.: 382,456

[30] Foreign Application Priority Data
July 26, 1972 France .......................... 72.26825

[52] U.S. Cl. .... 252/429 B, 252/431 R, 260/88.2 R, 260/94.9 C
[51] Int. Cl............................................ B01j 11/84
[58] Field of Search ..................... 252/429 B, 431 R

[56] References Cited
UNITED STATES PATENTS

| | | | |
|---|---|---|---|
| 2,936,302 | 5/1960 | Jones et al. | 252/429 B X |
| 3,072,630 | 1/1963 | de Jong et al. | 252/429 B X |
| 3,354,139 | 11/1967 | Vandenberg | 252/429 B X |
| 3,472,910 | 10/1969 | Favis | 252/429 B X |

*Primary Examiner*—Patrick P. Garvin

[57] ABSTRACT

Solid catalysts which can be used for the polymerization of olefins, essentially comprising compounds of magnesium and metals selected from the transition metals of sub-groups IVa, Va and VIa of the periodic table of elements, said catalysts being produced in accordance with a method which comprises in a first stage the preparation of a solid compound of magnesium and a transition metal by the reaction of organomagnesium compounds, monohalogenated hydrocarbons and halogenated and/or organic derivatives of said transition metal taken in a state of valency at least equal to four, then, in a second stage, bringing the solid magnesium and transition metal compound resulting from the preceding reaction into contact with an oxidizing compound.

12 Claims, No Drawings

SOLID CATALYSTS FOR USE FOR THE POLYMERIZATION OF OLEFINS

This invention relates to solid catalysts which can be used for the polymerization of olefins and a method of preparing such catalysts.

Such catalysts are particularly suitable for the polymerization or co-polymerization of olefins having the formula $CH_2=CHR$, in which R is a hydrogen atom or an alkyl radical having a maximum of 8 carbon atoms, to produce polymers or co-polymers having a molecular weight which is generally above 50,000. These catalysts can also be used for the production of waxes of polyolefins having a molecular weight which, in most instances, is within the range of 10,000 to 200,000. In both such uses, the catalysts are adapted particularly to the polymerization of ethylene alone or in mixture with other olefins.

In the copending U.S. application, Ser. No. 265,652 filed on June 23, 1972, and entitled "Polymerization of Olefins and Catalysts For Same", description is made of catalysts which can be used for the polymerization of olefins, said catalysts comprising compounds of magnesium and transition metals of sub-groups IVa, Va and VIa of the periodic table of elements. Generally, these catalysts are prepared by the reaction of organomagnesium compounds, mono-halogenated hydrocarbons and compounds of the transition metals, with the preparation carried out in the absence of oxidizing agents, such as oxygen.

Analysis of the above-mentioned catalysts shows that they contain in particular, in combined form, magnesium and transition metal or metals, the latter metals being, at least in a very large part, in a state of valence lower than that in which they were used during the operation of preparing the catalysts. For example, when the catalysts are prepared from, compounds of tetravalent titanium, at least the major part of the titanium which they contain is in the trivalent state.

Applicants have discovered catalysts based on magnesium and transition metals, the preparation of which comprises a treatment by means of oxidizing compounds and in which the transition metal or metals are on average in a state of valency higher than that in which they occurred in the above-mentioned catalysts. For example, when the catalysts are prepared from compounds of tetravalent titanium, at least a substantial portion of the titanium is intermediately reduced to the trivalent state before being reoxidized to the tetravalent state.

The invention therefore relates to solid catalysts which can be used for the polymerization of olefins, the catalysts essentially comprising compounds of magnesium and metals selected from the transition metals of sub-groups IVa, Va and VIa of the periodic table of elements, said catalysts being produced, in accordance with a method, comprising, in a first stage reaction, the preparation of a solid compound of magnesium and a transition metal by the reaction of organo-magnesium compounds, mono-halogenated hydrocarbons and halogenated and/or organic derivatives of said transition metal, in a state of valency at least equal to four, then, in a second stage reaction, bringing the solid compound of magnesium and transition metal resulting from the above reaction, into contact with an oxidizing compound.

The transition metals of sub-groups IVa, Va and VIa of the periodic table of elements, referred to in the preceding paragraph, comprise titanium, vanadium, chromium, zirconium, niobium, molybdenum, hafnium, tantalum, tungsten, thorium and uranium.

The preferred derivatives of the transition metals comprise compounds of tetravalent titanium, having the general formula $TiX_{4-m}(OR)_m$ in which X represents a halogen atom, generally chlorine, R is an alkyl radical containing 2 to 8 carbon atoms and $m$ is an integer or a fraction which can be of any value from 0 to 4. The compounds of titanium which correspond to this definition include, by way of example, titanium tetrachloride $TiCl_4$ or alkyl tetratitanates having the formula $Ti(OR)_4$. The compounds corresponding to the general formula $TiX_{4-m}(OR)_m$, in which $m$ is from 0 and from 4, can be produced from calculated amounts of a titanium tetrahalide having the formula $TiX_4$ and an alkyl tetratitanate having the formula $Ti(OR)_4$, in accordance with a functional interchange reaction which can be written as follows:

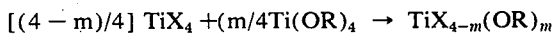

$$[(4-m)/4]\,TiX_4 + (m/4)Ti(OR)_4 \rightarrow TiX_{4-m}(OR)_m$$

The derivatives of the transition metals used in the first stage reaction of this invention can also comprise compounds where vanadium is substituted for titanium in the above formula, such as vanadium tetrachloride.

The mono-halogenated hydrocarbons are advantageously selected from chlorinated or brominated derivatives of saturated aliphatic hydrocarbons, corresponding to the formula $C_nH_{2n+1}X$, in which X represents a chlorine or bromine atom and $n$ is an integer which is preferably from 1 to 12. The mono-halogenated hydrocarbons can also be selected from cyclanic derivatives or aromatic derivatives.

The catalysts of this invention can be prepared from a wide variety of organo-magnesium compounds. These are produced by any of the well-known methods and, in particular, in accordance with the Grignard method which comprises reacting magnesium in the metallic state and an organic mono-halogenated derivative having the formula $R'-X$ in which $R'$ represents a hydrocarbon radical, such as an alkyl group, and X represents a halogen, such as chlorine or bromine. The Grignard reaction is most often performed in the presence of substantial amounts of an ether, such as ethoxyethane. The formed organo-magnesium compounds, the formula of which is generally written in conventional manner in the form $R'-Mg-X$, then comprise etherates dissolved in an excess of the ether. These organo-magnesium compounds, which are solvated by the ether, can be used directly in the preparation of the catalysts of the invention. They can also be used after the solvating ethers have first been removed, as by heating.

The organo-magnesium compounds can also be prepared directly in a substantially non-solvated form by the reaction of metallic magnesium and a mono-halogenated organic compound, such as an alkyl halide. This reaction is carried out in a non-polar solvent, such as a liquid hydrocarbon, and in the absence of substantial amounts of polar compounds, such as ethers, which are capable of solvating the organo-magnesium compounds. It can be initiated by means of catalytic amounts of iodine and possibly a small amount of an ether, such as ethyloxide. The substantially non-solvated organo-magnesium compounds produced are generally slightly soluble in the solvent in which they were prepared and consequently they occur in the form of suspensions. They can be used in this form or after they have been separated from the solvent.

The catalysts of this invention can also be prepared from organo-magnesium compounds corresponding to the formula R'-Mg-R" in which R' and R" represent hydrocarbon groups, such as alkyl radicals. These compounds, which are currently referred to as symmetrical organo-magnesium compounds, can be produced for example from organo-lithium compounds in accordance with any one of the following two reactions:

R'-Mg-X + R"Li → R"-Mg-R" + LiX or    2R'-Li + MgX$_2$ → R'-Mg-R' + 2LiX

The symmetrical organo-magnesium compounds can also be prepared from mixed organo-magnesium compounds, in accordance with the reaction:

2R'-Mg-X → R'-Mg-R' + MgX$_2$

The symmetrical organo-magnesium compounds can be isolated, after separation of the lithium or magnesium halides formed. They are generally slightly soluble in the non-polar solvents, unless they are solvated by ethers.

It is advantageous for the reaction between the organo-magnesium compounds, the mono-halogenated hydrocarbons and the transition metal compounds, to be carried out with the reactants being present in amounts such that:

the ratio between the number of molecules of the mono-halogenated hydrocarbons and the number of organic radicals of the organo-magnesium compounds is equal to or greater than 1 and preferably within the range of 1 to 2, the ratio between the number of molecules of the transition metal compounds and the number of molecules in the organo-magnesium compounds is less than or equal to 0.33 and is preferably within the range of 0.25 to 0.33.

It has been noted that the value of the ratio between the number of mono-halogenated hydrocarbon molecules and the number of magnesium atoms has an influence on the composition of the magnesium and transition metal compound produced. In fact, when this ratio is less than a value approximately equal to 0.5, the compound produced contains organic radicals from the mono-halogenated hydrocarbon. On the other hand, when this ratio is equal to or greater than a value of approximately 1, and the transition metal derivative used is a halide, analysis of the compound produced reveals the absence of organic radicals.

It has also been noticed that the transition metal is reduced, during the reaction, in an amount which is proportionate to the content of organo-magnesium compounds in the reaction medium, i.e., increased reduction with increase in content of organo-magnesium compounds in the reaction medium. Thus, when the transition metal compound is a tetravalent titanium compound, it was noticed that, in order to obtain complete reduction of the titanium compound to the trivalent state, the ratio between the number of titanium atoms and the number of organic radicals of the organo-magnesium compound should be less than or equal to approximately one-third.

The reaction between the organo-magnesium compounds, the mono-halogenated hydrocarbons and the transition metal compounds is advantageously carried out in an inert liquid which constitutes a thermal control and which, because of this, regulates the reaction. Liquid hydrocarbons and in particular aliphatic hydrocarbons, such as n-heptane or mixtures of hydrocarbons of petroleum origin, are particularly suitable. The amount of inert solvent used can be varied within wide limits. In practice, it is convenient to make use of amounts of inert liquid such that the reaction medium contains from 10 to 500 g of magnesium per litre.

The reaction between the organo-magnesium compounds, the mono-halogenated hydrocarbons and the transition metal compounds can be carried out in accordance with different modes of operation. Thus, for example, the different reactants can be introduced into an inert liquid at a temperature which is sufficiently low for the reaction not to begin. The reaction mixture is then heated with stirring, and maintained at a temperature sufficient for the reaction to be maintained, generally within the range of $-20°$ to $150°C$, over a period of a few minutes to a few hours. In accordance with another procedure, the various reactants, except for the organo-magnesium compound or the mono-halogenated hydrocarbon, are introduced into the inert liquid. The mixture is then stirred, at a sufficiently high temperature to initiate the reaction, whereupon the missing reactant is progressively introduced into the reaction medium and the reaction is carried out as described above.

The evolution of the reaction can be observed by measuring the transition metal compound in the liquid phase of the reaction medium. When the concentration of this compound is reduced to zero or to a constant, the reaction is concluded and the solid compound produced can be washed with a solvent, such as one or more aliphatic hydrocarbons, until virtually no more of the halogenated compounds appear in the washing solvent. It can then be isolated and dried, or kept in suspension in some solvent.

The oxidizing treatment, to which the solid magnesium and transition metal compound resulting from the first stage of the method is subjected, can be carried out in different ways. Thus for example, the solid compound can be brought into contact with the oxidizing compound in an inert liquid, such as n-heptane or a petroleum solvent in which it is suspended, while the inert liquid can, in particular, comprise the medium in which the solid compound is prepared. The oxidizing compound is then dispersed in gaseous form in the inert liquid, or dissolved in said liquid. More simply, the oxidizing treatment can be carried out by placing the solid magnesium and transition metal compound, in a substantially dry condition, in an atmosphere containing a gaseous oxidizing agent. This method of oxidizing treatment can be carried out either statically, with the solid compound being at rest in the oxidizing atmosphere, or dynamically, as in the course of pneumatic conveyance of the solid compound by means of an oxidizing propellant gas, or in the course of an operation of introducing the solid compound into an olefin polymerization reaction vessel.

The oxidizing compound preferably comprises atomic or molecular oxygen in pure form or in the form of an oxygen containing gas, such as dry air. It can also comprise a halogen, such as chlorine, bromine or iodine.

For reasons of convenience, the oxidizing treatment is generally carried out near ambient temperature or slightly above. The length of the oxidizing treatment depends on the nature of the magnesium compound, the nature of the oxidizing agent, and the temperature. Thus, for example, virtually total oxidization by the oxygen in the air, of a compound of magnesium and titanium which is prepared from titanium tetrachloride, requires approximately 20 hours at a temperature in the vicinity of 20° C. At a temperature of the order of 100°C, this period can be reduced to 8 hours. When incomplete oxidation of the transition metal is desired, it is necessary to limit either the duration of the treatment or the amount of oxidizing compound used, the later method being preferred when a precise degree of oxidation of the transition metal compound is desired.

It is also possible to subject the catalyst or the solid magnesium and transition metal compound to a physical treatment in order to modify the physical form thereof or to select the solid particles which are of a given granulometry. This physical treatment can be carried out on the catalyst itself or on the solid magnesium and transition metal compound, or during oxidization of the latter compound. This physical treatment can comprise, in particular, crushing or elutriation, for example, in a stream of gas such as oxygen or air, in order to separate out the particles whose dimension lies between two given limits. Catalysts having a selected or uniform granulometry or grain size are particularly suitable for the polymerization of olefins in the gaseous phase.

The catalysts of this invention occur in the form of finely divided solids which are generally finely divided. Analysis shows that they contain, in particular, in a combined form, magnesium which does not have the reducing properties of the organo-magnesium compounds and the transition metal, in a state of valency higher than that in which it occurred in the solid magnesium and transition metal compound. In the case of catalysts based on titanium or vanadium, this transition metal exists therein, in large part, in the tetravalent state. As indicated above, the catalysts can also contain organic radicals.

The catalysts according to the invention have a very high degree of catalytic activity in the polymerization of olefins, both in the presence of a liquid dispersing agent and in the gaseous phase.

The substantial catalytic activity of the catalysts of this invention distinguishes them entirely from catalysts based on reduced transition metal halides, such as titanium trichloride. When the transition metal has been completely oxidized, the catalysts of the invention also have the advantage of being particularly suitable for use because of their relative insensitivity to oxygen, in contrast to the previously known catalysts referred to above. Consequently, they can be preserved, weighed, and introduced into polymerization reaction vessels without the necessity for taking particular precautions. Their case of use is further increased because they can, without difficulty, be subjected to a supplementary physical treatment, such as crushing or elutriation.

The catalysts of the invention can be used for the polymerization or copolymerization of olefins, such as ethylene and/or olefins having the formula $CH_2=CHR$, in which R represents an alkyl radical having from 1 to 8 carbon atoms. In this type of polymerization, the catalysts of the invention are associated with co-catalysts which are preferably selected from organo-metallic compounds of the metals of groups II and III of the periodic table of elements, such as organo-aluminum compounds having the general formula $AlR_nX_{3-n}$, in which R represents hydrogen and/or an alkyl group having from 1 to 10 carbon atoms, X is a halogen atom, preferably chlorine, and $n$ is an integer or a fraction which can be of any value of from 1 to 3. These co-catalysts are advantageously used in amounts such that the molecular ratio between the metals of groups II and III of the co-catalysts, and the transition metals of sub-groups IVa, Va and VIa of the catalysts, is within the range of 1 to 50.

The catalysts of the invention can be used in particular for the polymerization of olefins in accordance with the so-called "low pressure" polymerization which generally comprises operating under a pressure less than 20 bars and at a temperature of from 40° to 150°C. Polymerization can be carried out in a liquid in which the catalyst is dispersed, which liquid can be the liquefied monomer or a saturated aliphatic hydrocarbon. Polymerization can also be carried out in the gaseous phase, in the absence of liquid diluent. In the course of polymerization, it is possible to control the mean molecular weight of the polymer formed by means of a chain limiter, such as hydrogen, in molecular proportions, relative to the olefin to be polymerized, which are generally within the range of 10 to 80%. Polymerization is stopped when the polymer reaches the desired mean molecular weight which, in most cases, is from 50,000 to 1,000,000 in the case of polymers intended for the conventional uses of thermoplastic materials or generally from 10,000 to 200,000 when they are polyolefin waxes. Because of the high degree of activity of the catalysts of the invention, the polymers produced contain only very small amounts of metals and they can be used without the necessity of being subjected to a purification treatment.

EXAMPLE 1 a. Preparation of the catalyst

First, n-butylmagnesium chloride is prepared in a stainless steel reaction vessel having a capacity of 5 litres, provided with a mechanical stirrer and a device for heating or cooling by circulating a fluid in a double jacket.

The following are introduced into the reaction vessel under a nitrogen atmosphere and at ambient temperature:

7.3 g (300 millimoles) of magnesium in powder form
600 ml of dry n-heptane
27.8 g (300 milimoles) of n-butyl chloride
an iodine crystal.

The reaction mixture is heated to 75° C and the reaction starts. The reaction is maintained under these conditions for 2 hours. This results in a suspension of 300 millimoles of n-butyl magnesium chloride in n-heptane.

Still under the nitrogen atmosphere, the suspension of n-butyl magnesium chloride is heated at 75°C and the following mixture is progressively introduced over a period of 2 hours, by means of a metering pump:

9.5 g (50 millimoles) of titanium tetrachloride
14.25 g (50 millimoles) of n-propyltitanate
27.8 (300 millimoles) of n-butyl chloride in 350 ml of n-heptane.

The introduction operation being concluded, the reaction medium is kept at 75° C, with agitation, for 1 hour.

The brown-black precipitate produced is washed several times with n-heptane. Its composition, in percent by weight, is as follows:

TiO 10.5%; Mg: 17.5%; Cl: 54%; organic residues: 18%.

Analysis of this precipitate shows that the titanium which it contains is virtually totally in the trivalent state.

The above precipitate is kept under agitation at ambient temperature. By means of a conduit, which communicates with the bottom of the reaction vessel, dry air is then bubbled therethrough at a flow rate of 120 l/h, for a period of 4 hours.

After the catalyst thus produced has been washed with n-heptane, it is analyzed. This analysis shows that the titanium which it contains is virtually totally in the tetravalent state.

b. Polymerization of ethylene

The following are successively introduced under a nitrogen atmosphere into a stainless steel 5 litre reaction vessel, identical to that used above:

2 litres of n-heptane which is heated to 70° C
0.79 g (4 millimoles) of triisobutylaluminium
an amount of the catalyst prepared in (a) above, corresponding 0.5 milligram-atom of titanium.

The mixture is heated to 75° C and hydrogen is introduced into the reaction vessel until the pressure reaches 3 bars, followed by ethylene at a flow rate of 160 g/hour. After 7 hours of polymerization under a maximum total pressure of 4.5 bars, 1120 g of a polyethylene is collected, the titanium content of which is 22 parts by weight per million (ppm). The index of fluidity of the polymer, at 190° C and under a load of 2.16 kg, is 6.2. Its apparent density (AD) is 0.41 g/ccm.

c. Comparative test

By way of comparison, 1.8 g (10 millimoles) of monopropoxydichlorotitanium, in 500 ml of n-heptane, is placed in suspension in a 1 litre glass balloon flask. This compound of trivalent titanium is oxidized (as described in 1a), by bubbling dry air into the monopropoxydichlorotitanium suspension, at a flow rate of 120 l/h over a period of 4 hours at ambient temperature.

The monopropoxydichlorotitanium then takes on a flaky appearance. Polymerization of ethylene is carried out as described in 1b.

After hydrogen has been introduced until the pressure is 2 bars, ethylene is introduced at a flow rate of 160 g/h. Polymerization starts only when the pressure in the reaction vessel reaches 9 bars and the flow rate of ethylene absorbed rapidly decreases.

After polymerization for 4 hours, 70 g of a polyethylene powder, containing numerous agglomerates and thread formations, is collected.

EXAMPLE 2 a. Preparation of the catalyst n-Butylmagnesium chloride is first prepared in the same manner as in Example 1a.

Still under a nitrogen atmosphere, the n-butylmagnesium chloride suspension is heated to 75°C and a solution of 19 g (100 millimoles) of titanium tetrachloride and 27.8 (300 millimoles) of n-butyl chloride in 350 ml of n-heptane is progressively introduced over a period of 2 hours, by means of a metering pump.

When this has been done, the reaction medium is maintained at a temperature of 75°C, with stirring, for 1 hour.

The brown-black precipitate obtained is washed several times with n-heptane. Its composition by weight is as follows:

Ti: 8.1%; Mg: 18%; Cl: 73.9%.

Analysis of this precipitate shows that the titanium which it contains is virtually all in the trivalent state. This solid precipitate is then oxidized as in Example 1a, except that oxidation is carried out by bubbling pure oxygen, which is introduced at ambient temperature, at a flow rate of 20 l/h, for a period of 6 hours.

b. Polymerization of ethylene

Operation is as in Example 1b, except that hydrogen is introduced until the pressure reaches 5 bars. 1100 g of a polyethylene containing 21 ppm of titanium is collected. Its apparent density is 0.42 g/ccm and its index of fluidity, under a load of 2.16 kg, is 5.1.

EXAMPLE 3 a. Preparation of the catalyst

Ethylmagnesium chloride is first prepared in a stainless steel reaction vessel provided with a mechanical stirrer and a means for heating and cooling by circulating fluid in a double jacket.

Again under a nitrogen atmosphere, the suspension of ethylmagnesium chloride is heated to 75°C and a solution of 9.5 g (50 millimoles) of titanium tetrachloride, 14.25 g (50 millimoles) of n-propyltitanate and 19.36 g (300 millimoles) of ethyl chloride in 350 ml of n-heptane, is introduced progressively over a period of 2 hours, by means of a metering pump. When this has been done, the reaction medium is kept at 75°C, with stirring, for one hour.

The brown-black precipitate is then oxidized, as described in Example 1a.

b. Polymerization of ethylene.

Operation is as in Example 1b. 1100 g of a polyethylene, containing 20 ppm of titanium, is collected. Its apparent density is 0.39 g/ccm and its index of fluidity, under a load of 2.16 kg, is 4.5.

EXAMPLE 4 a. Preparation of the catalyst

A solid precipitate is prepared by reacting n-butylmagnesium chloride, titanium tetrachloride, n-propyltitanate and n-butylchloride, as described in Example 1a.

The brown-black precipitate produced is then introduced into a 2 litre glass balloon flask under a nitrogen atmosphere. The following are introduced into the balloon flask, with stiring, at ambient temperature:

50 g of bisublimated iodine and
500 ml of n-heptane.

The mixture is stirred for 8 hours. The solid matter is then washed several times with n-heptane.

Analysis shows that 90% of the titanium of the catalyst is oxidized to the tetravalent state.

b. Polymerization of ethylene

Operation is as in Example 1b. 1110 g of a polyethylene, containing 21 ppm of titanium, is collected. Its apparent density is 0.40 g/ccm and its index of fluidity, under a load of 2.16 kg, is 3.1.

EXAMPLE 5 a. Preparation of the catalyst

Operation is as in Example 1a, except that the solid precipitate is oxidized by means of gaseous chlorine which is introduced into the reaction vessel at a flow rate of 10 l/h for a period of 5 hours.

The catalyst is then washed several times with n-heptane. Analysis shows that 95% of the titanium is oxidized to the tetravalent state.

b. Polymerization of ethylene

Operation is as in Example 1b. 1100 g of a polyethylene, containing 22 ppm of titanium, is collected. Its apparent density is 0.42 g/ccm and its index of fluidity, under a load of 2.16 kg, is 2.1.

EXAMPLE 6 a. Preparation of the catalyst

Operation is as in Example 1a, except that the equimolecular mixture of titanium tetrachloride and n-propyltitanate is replaced by 19.3 g (100 millimoles) of vanadium tetrachloride.

The brown-black precipitate produced is then oxidized as described in Example 1.

b. Polymerization of ethylene

Operation is as in Example 1b. After polymerization for 3 hours, 400 g of a polyethylene is collected, whose index of fluidity at 190°C and under a load of 5 kg, is 0.6.

EXAMPLE 7 a. Preparation of the catalyst

A solid precipitate is prepared by reacting n-butylmagnesium chloride, titanium tetrachloride, n-propyltituante and n-butylchloride, as described in Example 1a.

The brown-black precipitate produced is dried under vacuum and then subjected to granulometric selection by means of air, in the course of which operation the precipitate is oxidized.

This selection operation is carried out in a glass tube having a diameter of 60 mm and a height of 60 cm, and which is provided in its lower part with a plate of fritted glass. A stream of air is passed through the tube, rising at a rate of 5 l/minute, the air being at a temperature of 20°C.

The fine particles, entrained by the flow of air, are collected by a cyclone separator. After 2 hours, 36 g of a catalyst comprising particles having a diameter greater than 25 microns is collected on the glass plate. Analysis shows that the titanium contained in this catalyst is entirely in the tetravalent state.

b. Polymerization of ethylene

Operation is as in Example 1b. 1120 g of a polyethylene, containing 20 ppm of titanium, is collected. Its apparent density is 0.38 g/ccm and its index of fluidity, at 190°C under a load of 2.16 kg, is 5.2.

EXAMPLE 8

2 litres of n-heptane is introduced under a nitrogen atmosphere at ambient temperature into a 5 litre stainless steel reaction vessel provided with a mechanical stirrer. After the n-heptane has been heated to 60°C, the following are introduced:

0.6 g (5 millimoles) of diethylaluminium chloride
an amount of catalyst prepared as in Example 1a, corresponding to 2 milligram-atoms of titanium.

While the reaction medium is maintained at 60°C, hydrogen is introduced thereinto until the pressure is 0.3 bars, followed by propylene at a flow rate sufficient to maintain the pressure at 5.3 bars during the polymerization operation.

After 6 hours of polymerization, 580 g of a polypropylene wax is collected.

We claim:

1. The method for producing solid catalysts which can be used in the polymerization of olefins consisting essentially of reacting at a temperature within the range of −20°C to 150°C an organo-magnesium compound represented by the formulae $R'\,Mg\,X$ and $R'\,Mg\,R'$ in which $R'$ is a hydrocarbon group and X is a halogen, mono-halogenated hydrocarbon and a compound selected from the group consisting of derivatives of a transition metal represented by the formula $M\,X_{4-m}(OR)_m$ in which X is a halogen atom, R is an alkyl radical containing 2–8 carbon atoms, $m$ is a number of from 0 to 4 and M is a metal selected from the group consisting of metals sub-groups IVa, Va and VIa of the periodic table of elements with the metal in a state of valency of at least four, and then contacting the solid magnesium and transition metal compound resulting from the previous reaction with an oxidizing compound to convert at least a portion of the transition metal to its original valence, in which the organo-magnesium compound, mono-halogenated hydrocarbon, and transition metal compound are reacted in amounts such that:

a. the ratio between the number of mono-halogenated hydrocarbon molecules and the number of organic radicals of the organo-magnesium compounds is at least 1,
   b. the ratio between the number of molecules of the compounds of the transition metals and the number of organo-magnesium compound molecules is not more than 0.33.

2. The process as claimed in claim 1, in which the organo-magnesium compound, mono-halogenated hydrocarbon, and transition metal compound are reacted in amounts such that:

a. the ratio between the number of mono-halogenated hydrocarbon molecules and the number of organic radicals of the organo-magnesium compounds is within the range of 1 to 2,
   b. the ratio between the number of molecules of the compounds of the transition metals and the number of organo-magnesium compound molecules is within the range of 0.25 to 0.33.

3. The method as claimed in claim 1, in which the oxidizing compound is atomic or molecular oxygen.

4. The method as claimed in claim 1, in which the oxidizing compound is a halogen.

5. The method as claimed in claim 4, in which the halogen is selected from the group consisting of chlorine, bromine and iodine.

6. The method as claimed in claim 1, in which the solid magnesium and transition metal compound is subjected to crushing or elutriation at the same time that it is brought into contact with an oxidizing agent.

7. The method as claimed in claim 1, the step of subjecting the catalyst to crushing or elutriation as a supplementary physical treatment.

8. The method as claimed in claim 1, in which the derivatives of the transition metals comprise compounds of titanium having the general formula $TiX_{4-m}(OR)_m$, X represents a halogen atom, R represents an alkyl group and *m* represents an integer or a fraction which can be of any value from 0 to 4, and in which the monohalogenated hydrocarbon is a chlorinated or brominated derivative of a saturated aliphatic hydrocarbon containing less than 12 atoms of carbon.

9. The method as claimed in claim 1, in which the derivatives of the transition metals comprise vanadium halides.

10. The method as claimed in claim 8, in which the halogen is chlorine.

11. The method as claimed in claim 9, in which the vanadium halide is vanadium tetrachloride.

12. Solid catalysts which can be used for the polymerization of olefins, consisting essentially of the product prepared by the method of claim 1.

* * * * *